March 9, 1971 KEIZABURO USUI ET AL 3,568,442
HYDRAULIC PRESSURE TO AN AUTOMATIC TRANSMISSION
OF AN AUTOMOTIVE VEHICLE
Filed June 30, 1969 9 Sheets-Sheet 9

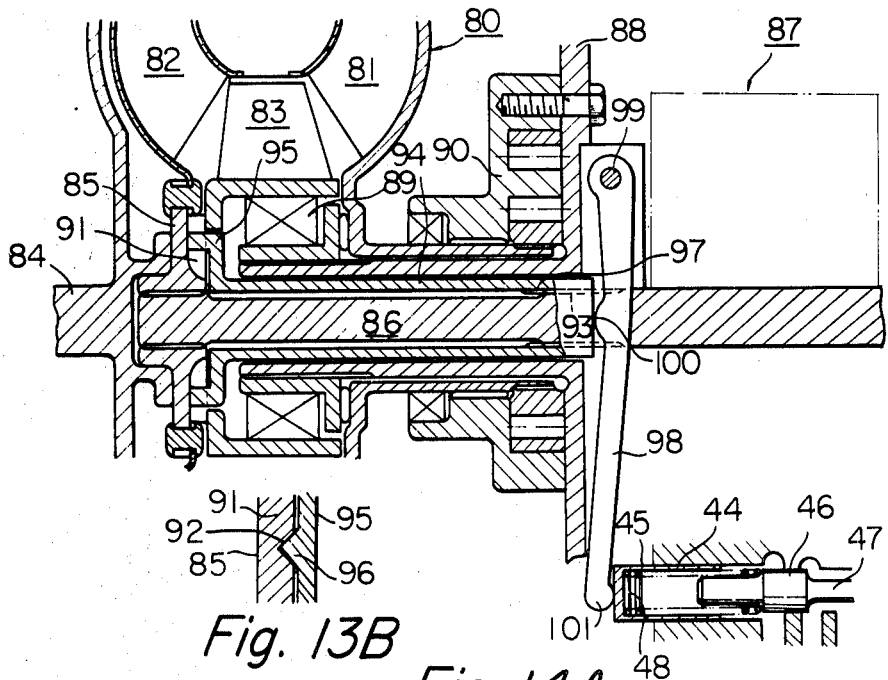
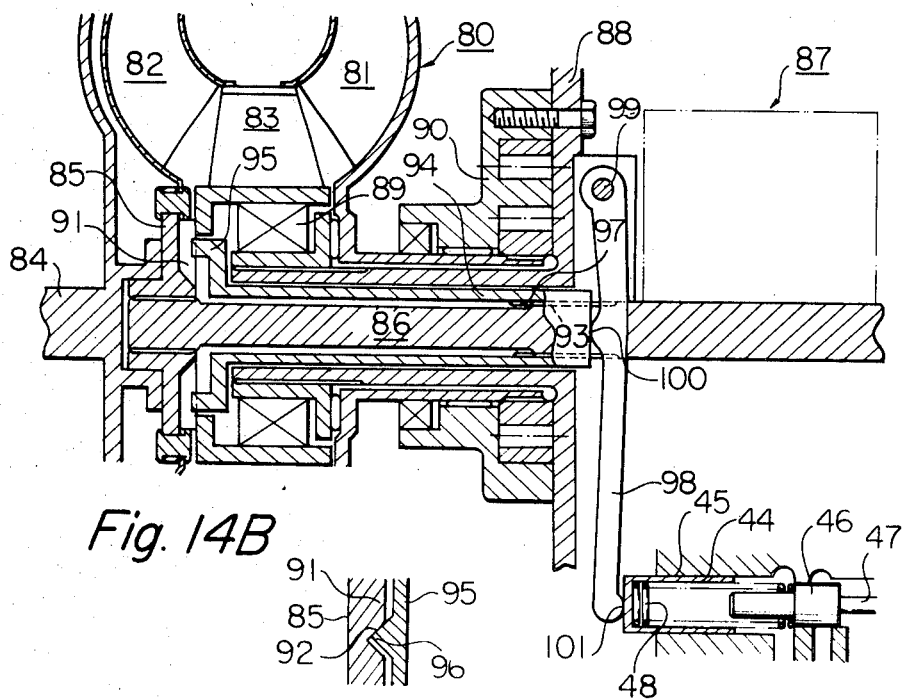

INVENTOR
KEIZABURO USUI
KAZUYOSHI HIRAIWA
BY
John Lezdley
ATTORNEY

United States Patent Office 3,568,442
Patented Mar. 9, 1971

3,568,442
HYDRAULIC PRESSURE TO AN AUTOMATIC TRANSMISSION OF AN AUTOMOTIVE VEHICLE
Keizaburo Usui, Ichikawa, and Kazuyoshi Hiraiwa, Tachikawa, Japan, assignors to Nissan Motor Company, Limited, Yokohama, Japan
Filed June 30, 1969, Ser. No. 837,641
Claims priority, application Japan, Sept. 18, 1968, 43/67,090
Int. Cl. F16d 33/10; F16b 47/06
U.S. Cl. 60—54
5 Claims

ABSTRACT OF THE DISCLOSURE

A device for controlling a hydraulic pressure in a hydraulic control system to an automatic transmission of an automotive vehicle in response to the changes of the torque of the turbine shaft of the torque converter. This control is performed by converting the twisting torque occurring in a power transmitting shaft within a predetermined distance into an axial displacement which causes a movement of a lever with which a hydraulic control valve is so actuated as to open or close a by-pass passage of an oil pump as a source of hydraulic pressure.

---

Thi invention relates to a device for controlling a hydraulic pressure to an automatic transmission of an automotive vehicle, and more particularly to improvements of a control device for hydraulic pressure in a hydraulic control circuit of the automatic transmission responding to the change of the torque of the turbine shaft of the torque converter.

In general, control systems of automatic transmissions operate automatically to shift speed ratios when conditions are such that they should be shifted. These have included a control system operated by the engine intake-manifold pressure or vacuum which is used in addition to the degree of a throttle. They usually include a control which operates in accordance with the automobile speed and causes the transmission to shift gears and thus change the torque and speed factors of the gear portion of the transmission.

Some of the above controls, in turn, control the fluid pressure that is applied to open and close gear-shift valves. These direct the transmission fluid to piston-and-cylinder devices which engage and disengage clutches and brakes in the transmission.

In the conventional control systems of the automatic transmission the fluid pressure has been intended to be controlled in response to the change of engine torque by the intake-manifold vacuum or movement of an accelerator pedal so as to operate the clutches and brakes in the transmission, but neither of the systems could control the fluid pressure in the control system of the transmission directly in response to the change of torque of the engine. Some operate to control the pressure delayedly with respect to the change of torque.

This invention therefore contemplates to eliminate this and other drawbacks thus far inherent in the conventional automatic transmission and it is a primary object of the present invention to provide a new and improved device for controlling hydraulic pressure to an automatic transmission of the vehicle which operates to control the pressure directly in response to the change of the torque of the turbine shaft of the torque converter.

Figure 1:
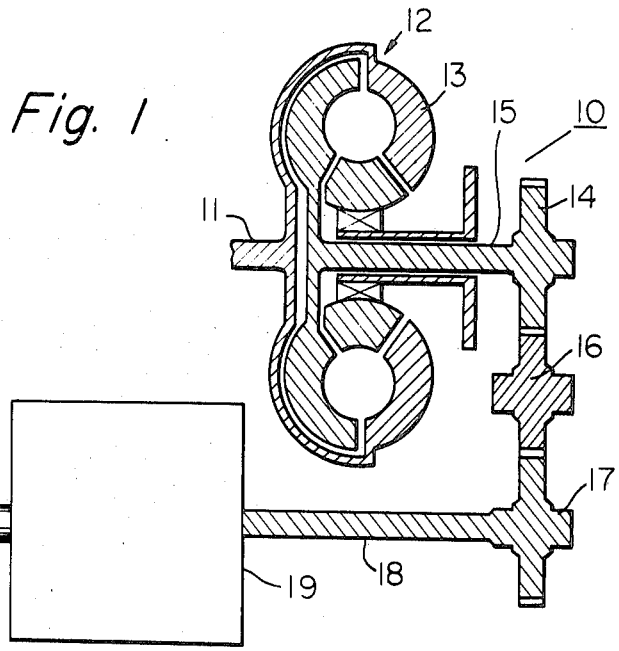
Figure 2:
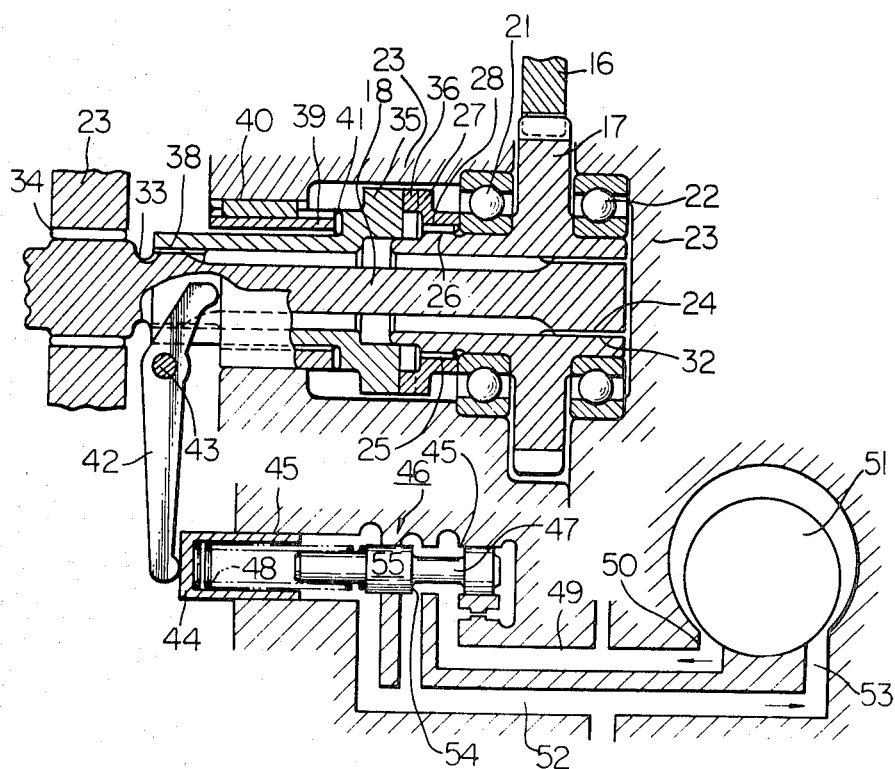
Figure 3:
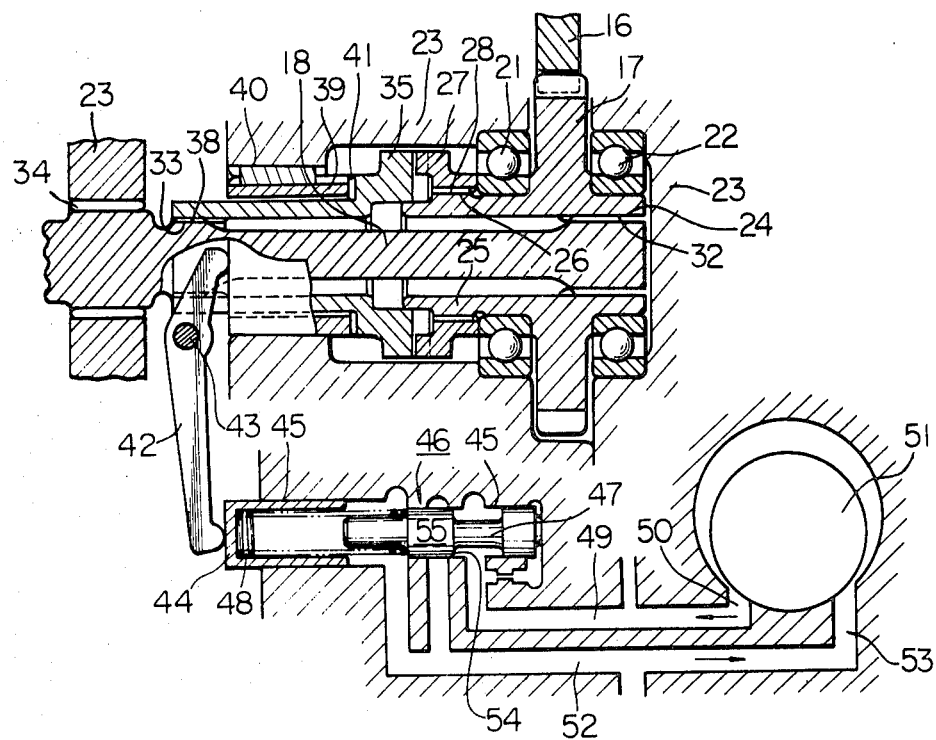
Figure 4:
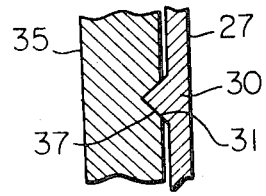
Figure 5:
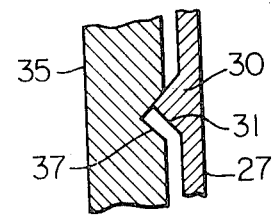
Figure 6:
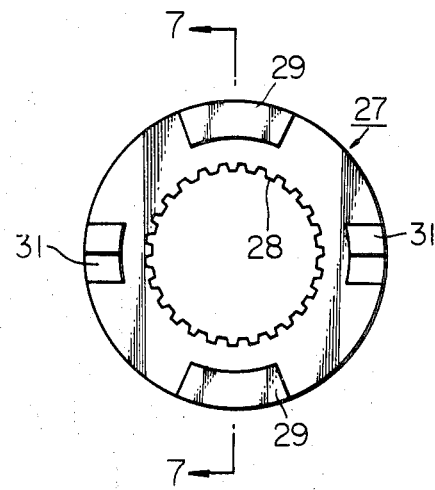
Figure 7:
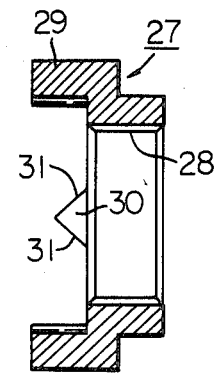
Figure 8:
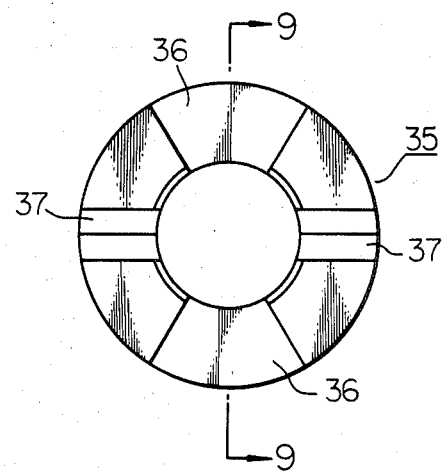
Figure 9:
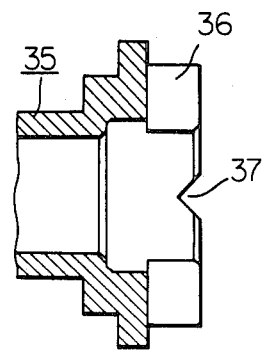
Figure 10:
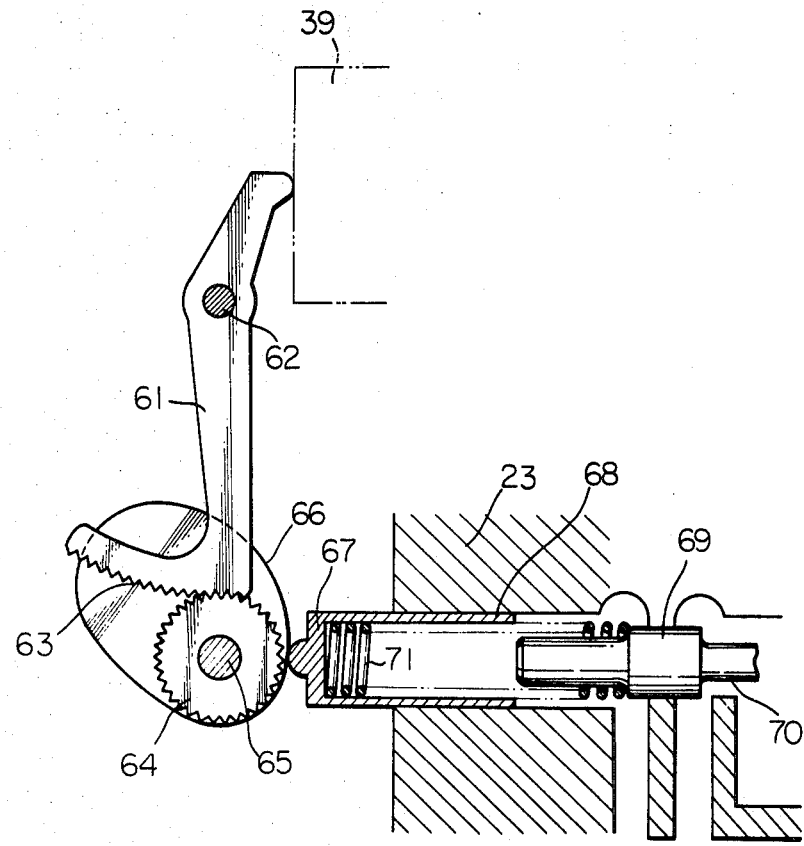
Figure 11:
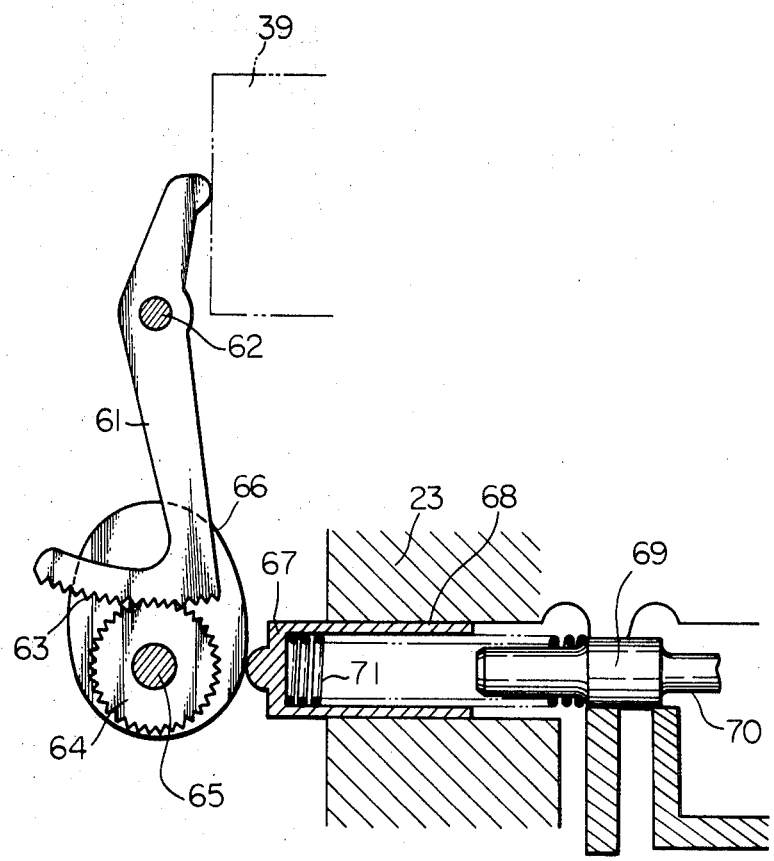
Figure 12:
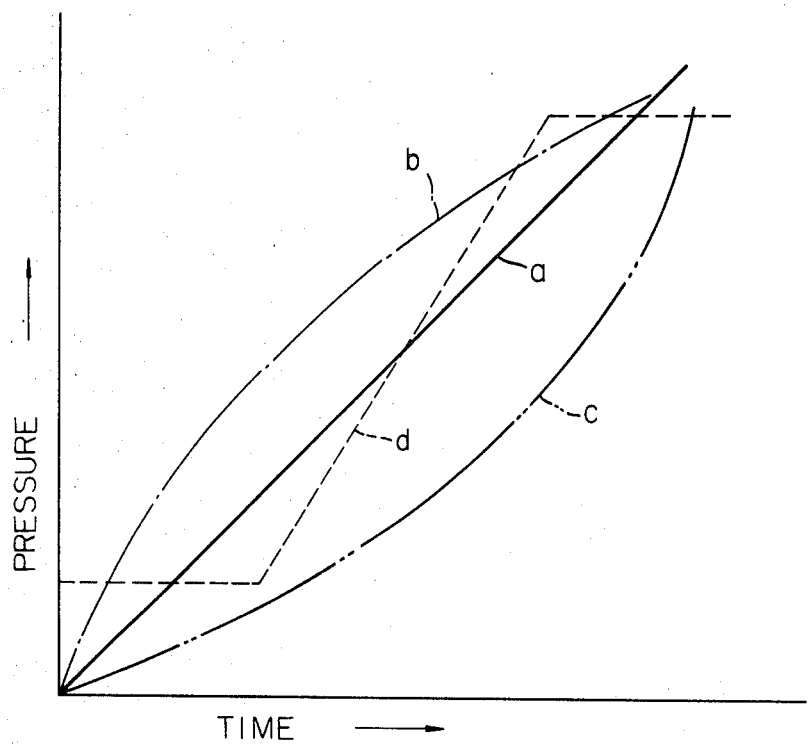
Figure 15:
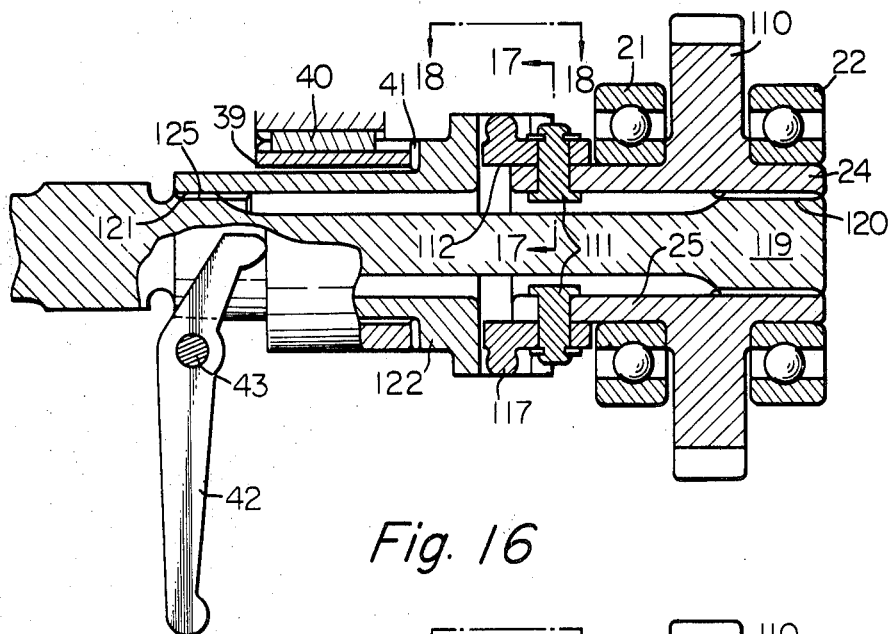
Figure 16:
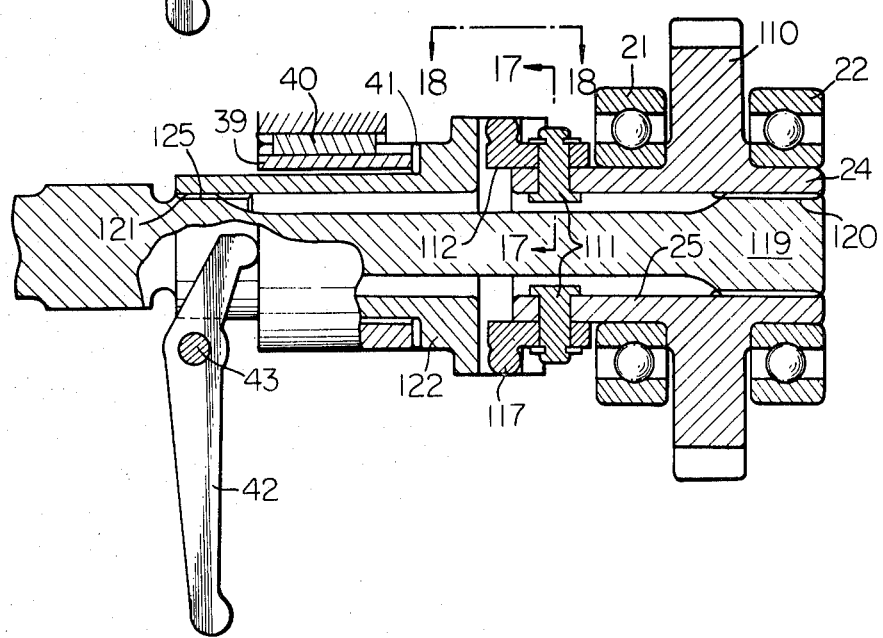
Figure 17:
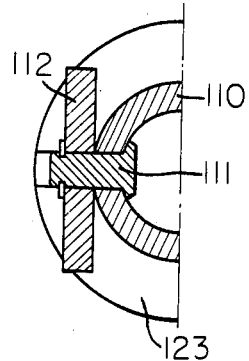
Figure 18:
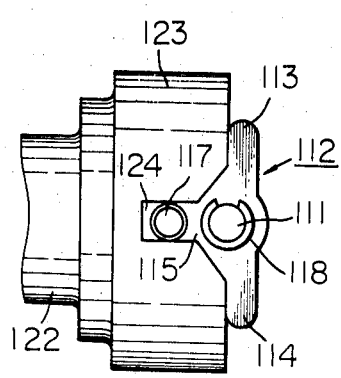
Figure 19:
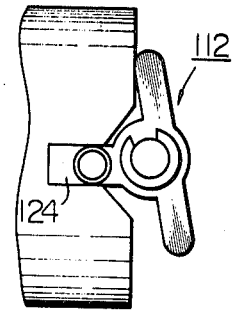
Figure 20:
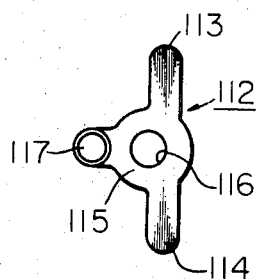
Figure 21:
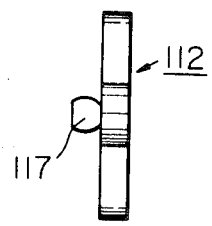

The features and advantages of the present invention will become apparent from the following description perused in conjunction with the accompanying drawings, in which:

FIG. 1 is a schematic view of a power transmission of an automotive vehicle,

FIGS. 2 and 3 are sectional views of a device for controlling hydraulic pressure to an automatic transmission embodying the present invention, FIGS. 4 and 5 are sectional views of a converting portion of twisting torque of a power transmitting shaft leading into axial displacement according to the present invention, FIG. 6 is an end view of a thrust ring used in the present device, FIG. 7 is a sectional view of the thrust ring along the lines 7—7 shown in FIG. 6, FIG. 8 is an end view of a slider used in the present device, FIG. 9 is a sectional view of the slider along the lines 9—9 shown in FIG. 8, FIGS. 10 and 11 are sectional views of an alternate converting portion of twisting torque of a power transmitting shaft leading into axial displacement according to the present invention, FIG. 12 is a graphical representation of hydraulic pressure in a control circuit of the automatic transmission, FIG. 13A is a sectional view of another alternative of the device according to the present invention, FIG. 13B is a sectional view of the engaging state between the recess of a boss and the projection of the flange of a slider, FIG. 14A is a sectional view similar to FIG. 13A but showing a different state in operation, FIG. 14B is a sectional view similar to FIG. 13B but showing a different state in operation, FIGS. 15 and 16 are views similar to FIGS. 2 and 3 but showing a further alternative of the device in accordance with the present invention, FIG. 17 is a sectional view of a part of the device shown in FIGS. 15 and 16 along the lines 17—17 shown in FIGS. 15 and 16, FIGS. 18 and 19 are views of a part of the device shown in FIGS. 15 and 16 along the lines 18—18 in the drawings, FIGS. 20 and 21 are plan and side views of a link used in the device shown in FIGS. 15 and 16.

A preferred example of a device for controlling hydraulic pressure to an automatic transmission of the vehicle is shown in FIGS. 1, 2 and 3, which transmission 10 has a drive shaft 11 connected with an output shaft of an automotive engine (not shown), a torque converter 12 in which a pump impeller 13 is connected with the drive shaft 11, a main gear 14 secured to the turbine shaft 15, an intermediate gear 16 meshing with the main gear 14, a countershaft gear 17 secured to the countershaft 18 and meshing with the intermediate gear 16, an auxiliary transmission 19 as will be described in detail hereinafter connected with the countershaft 18, and an output shaft 20 of the vehicle as shown in FIG. 1 and which device comprises in FIGS. 2 and 3 a gear 17 supported through bearings 21 and 22 by a transmission casing 23 and having an internal spline 24 formed inside thereof and an axial hollow extension 25 formed with an external spline 26, a thrust ring 27 having an internal spline 28 formed inside thereof for engaging with the external spline 26 of the gear 17, a plurality of axial extensions 29 and a plurality of projections 30 having tapered flanks 31 (FIGS. 4, 5, 6 and 7), a shaft 18 having an external spline 32 formed on one end and another external spline 33 formed on the other end and supported through a bearing 34 to the transmission casing 23, a slider 35 having a plurality of recesses 36 (FIG. 8) and channels 37 formed on one end and being wider than the said extension 29 of the thrust ring 27 and further having an internal spline 38 meshed with the external spline 33 of the shaft 18 so that the slider is slidable relative to the shaft 18 (FIGS. 8 and 9), said channels 37 formed correspondingly to the projections 30 of the thrust ring 27 having tapered sides, a sleeve 39 engaged with the transmission casing 23 so that it is fixed in rotational direction with a key 40 while it is axially slidable and in contact through a bearing 41 with the slider 35 at one end, a lever 42 supported by a pin 43 fixed to the transmission casing and having a fork at one end or the end in contact with the one end of the sleeve 39, a spring retainer 44 slidably inserted into a hole 45 formed in the transmission casing and in contact with the other end of the lever 42, a hydraulic pressure control valve 46 having a spool 47 slidably inserted into the hole 45, a spring 48 between the inside of the spring retainer 44 and the spool 47 of the valve 46 for applying pressure on the one end of the lever 42 at one end and on the spool 47 at the other end, a hydraulic circuit 49 connecting one end of the valve 46 with an outlet 50 of an oil pump 51, and another hydraulic circuit 52 connecting the other end of the valve 46 with an inlet 53 of the pump 51 so that the hydraulic pressure in the hydraulic circuit 49 connected with the outlet 50 of the pump 51 changes in response to the tension of the spring 48.

In this embodiment, while the gear 17 is not driven, the channel 37 of the slider 35 engages with the projection 30 of the thrust ring 27. Some play exists between the channel 37 of the slider 35 and the axial extension 29 of the thrust ring 27 so that when a predetermined phase difference occurs of the rotating direction between the channel 37 of the slider 35 and the projection 30 of the thrust ring 27 due to the torsion of the shaft 18 by the transmitting torque on the shaft 18, the slider 35 is stopped.

In operation of the device for controlling hydraulic pressure to an automatic transmission of the vehicle thus constructed as shown in FIGS. 2 and 3, the rotating force is transmitted through the gear 16 to the gear 17, then transmitted through the splines 24 and 32 and the shaft 18 to the auxiliary transmission 19 (FIG. 1).

Since the shaft 18 is twisted by the transmitting torque as previously described, there occurs a phase difference of the rotating angle between the splines 32 and 33 of the shaft 18. When the phase difference of the rotating angle of the splines 32 and 33 occurs, there also occurs a phase difference of the rotating angle of between the gear 17 and accordingly the thrust ring 27 integral with the spline 32 and the slider 35 engaged with the spline 33, so that the slider 35 is pushed leftwards in the drawing (FIG. 5) due to the slip between the tapered side of the channel 37 of the slider 35 and the tapered flank 31 of the projection 30 of the thrust ring 27 due to the torsion produced between the splines 32 and 33 of the shaft 18 as shown in FIG. 5. If this slip between the tapered side of the channel 37 of the slider 35 and the tapered flank 31 of the projection 30 of the thrust ring 27 thus occurs, the sleeve 39 is urged leftwards in the drawing through the bearing 41 so that the sleeve 39 pushes the one end of the lever 42 leftwards in the drawing. When the one end of the lever 42 is thus pushed by the sleeve 39 and accordingly the other end of the lever 42 pushes the spring retainer 44 rightwards in the drawing due to pivoting of the lever 42 around the shaft 43. If the spring retainer 44 is thus pushed by the other end of the lever 42, the spring 48 placed between the inside of the spring retainer 44 and the spool 47 of the hydraulic pressure control valve 46 is compressed increasing the tension of the spring 48.

When the spring retainer 44 is pressed by the other end of the lever 42 and accordingly the spring 48 is forced to be compressed, the spring 48 pushes the spool 47 of the control valve 46 rightwards in the drawing with the result that the by-pass 54 from the inlet 53 to the outlet 50 of the pump 51 in the control valve 46 is closed by the land 55 of the spool 47 and accordingly the exhaust pressure of the oil delivered from the oil pump 51 is controlled to increase in response to the tension of the spring 48. It follows that if the transmitting torque of the shaft 18 increases, the hydraulic pressure of the oil delivered from the pump 51 increases accordingly so that the hydraulic pressure delivered from the pump 51 changes proportionally to the transmitting torque of the rotation of the shaft 18.

As seen in FIGS. 4 through 9 the shape of the projection 30 of the thrust ring 27 and the channel 37 of the slider 35 are axially symmetrical at the center thereof with the result that the hydraulic pressure proportional to the rotating force or transmitting torque is provided by this device without respect to the direction of the rotation of the shaft 18. It means that even if an engine brake is acted on the automobile this device provides sufficient hydraulic pressure for operating the clutches and/or brakes in the transmission.

Referring now to FIGS. 10 and 11, which show an alternative of a converting portion of twisting torque of a turbine shaft of the torque converter displacement according to the present invention, this embodiment comprises a lever 61 supported through a pin 62 fixed to the transmission casing and touching at one end the sleeve 39 and having teeth 63 at the other end, a gear 64 supported on a shaft 65 attached to the transmission casing 23 and meshed with the teeth 63 of the lever 61, a cam 66 attached to the gear 64, a spring retainer 67 slidably inserted into a hole 68 formed in the transmission casing 23 and touching the surface of the cam 66, a hydraulic pressure control valve 69 having a spool 70 slidably inserted into the hole 68, a spring 71 disposed between the inside of the spring retainer 67 and the spool 70 of the valve 69 for applying pressure on the spool 70 of the hydraulic pressure control valve 69, instead of the lever 42 and the spring retainer 44 in the previous embodiment shown in FIGS. 2 and 3.

In operation of this embodiment shown in FIGS. 10 and 11, when the shaft 18 is twisted by the transmitting torque as previously described, a phase difference occurs of the rotating angle between the splines formed on both sides thereof (not shown) and accordingly a phase difference also occurs of the rotating angle of between the gear 17 and accordingly the thrust ring 27 integral with the spline at the gear 17 side and the slider (not shown) engaged with the spline on the lever 61 side, so that the slider is pushed leftwards in the drawing similarly to the operation in the previous embodiment. Thus, the sleeve 39 is pushed leftwards in the drawings so that the sleeve 39 pushes the one end of the lever 61 leftwards in the drawings. When the one end of the lever 61 is thus pushed by the sleeve 39, the gear 64 is driven by the other end of the lever 61 through the engagement of the teeth 63 of the lever 61 with the gear 64 and accordingly the cam 66 is driven integrally with the gear 64 around the shaft 65 as a center with the result that the spring retainer 67 is pushed by the cam 66 rightwards in the drawings. Thus, similarly to the operation of the spring retainer 44, spring 48 and the hydraulic pressure control valve 46 having the spool 47 in the previous embodiment shown in FIGS. 2 and 3, the spring retainer 67, spring 71, and the hydraulic pressure control valve 69 cause the spool 70 to operate to control the hydraulic pressure in the circuit in response to the transmitting torque of the shaft similarly to the operation of the previous embodiment.

In the control operation of this device, if the shape of the cam 66 is modified to a predetermined form, a predetermined change occurs such as shown by the curves b, c and d in FIG. 12 of the hydraulic pressure.

FIGS. 13A, 13B and 14A, 14B show a further alternative of the device for controlling a hydraulic pressure to an automotive transmission having a torque converter and a planetary gear set. In the transmission, the torque converter 80 includes an impeller 81, turbine 82 and stator 83. The impeller 81 is driven by an input shaft 84 such as a crank shaft of an automotive engine, and the turbine 82 is hydraulically driven by means of a hydraulic oil by the impeller 81. The driving force thus transmitted from the impeller 81 to the turbine 82 is transmitted through a boss 85 integral with the turbine 82 to an intermediate shaft 86. The driven intermediate shaft 86 drives a planetary gear set 87 so as to select a predetermined ratio between the engine shaft and the driven shaft of a vehicle (not shown). The stator 83 is fixed to a member 88 integral with the transmission casing by means of a one-way brake 89 in the low speed ratio so as to increase the transmission of the torque from the engine to the driven shaft (not shown). An oil pump 90 is driven directly by the impeller 81. The transmission of the torque from the engine to the driven shaft through the torque converter and the planetary gear set in the transmission is known per se, and the explanation thereof will be omitted.

The alternative of the device for controlling a hydraulic pressure to the transmission shown in FIGS. 13 and 14 comprises in addition to the boss 85 integral with the turbine 82 of the torque converter 80 and having a plurality of projections 91 formed with a plurality of recesses 92, an intermediate shaft 86 secured to the boss 85 at one end and having an external spline 93 at the other end; a slider 94 which has a flange 95 formed at one end and having a plurality of projections 96 the shapes of which are similar to those of the recesses 92 engaging in alignment with each other and which is hollow and is formed with an internal spline 97 at the other end and meshed with the external spline 93 of the shaft 86 and which is also supported by the shaft 86, a lever 98 rockably supported by a pin 99 fixed to the transmission casing 88 and formed with a contacting surface 100 at the middle thereof for touching the end surface of the slider 94 and also with a second touching surface 101 at the other end; and the spring retainer 44 inserted into the hole 45 formed in the transmission casing and touching the other end of the lever 98, the hydraulic pressure control valve 46 having the spool 47 slidably inserted into the hole 45, the spring 48 disposed between the inside of the spring retainer 44 and the spool 47 of the valve 46 for applying pressure on the one end of the lever 42 at one end of the spool 47 at the other end, the hydraulic circuit 49 connecting one end of the valve 46 with the outlet 50 of the oil pump, and another hydraulic circuit 52 connecting the other end of the valve 46 with the inlet 53 of the pump 51 so that the hydraulic pressure in the hydraulic circuit 49 connected with the outlet 50 of the pump 51 changes in response to the tension of the spring 48 similarly to that in the previous embodiment shown in FIGS. 2 and 3.

In operation of this embodiment constructed as shown in FIGS. 13A, 13B and 14A, 14B, when the turbine 82 of the torque converter 80 is hydraulically driven by the engine (not shown) through the impeller 81 thereof, the torque transmitted from the engine through the torque converter 80 is transmitted through the intermediate shaft 86, the intermediate shaft 86 is twisted due to the transmitting torque therethrough. When the shaft 86 is twisted, there occurs similarly to the previous embodiment shown in FIGS. 2 and 3 a phase difference of the rotating angle between one end of the shaft 86 secured to the boss 85 and the external spline formed at the other end of the shaft 86 and accordingly the slider 94 is pushed rightwards in the drawings due to the slip between the recess 92 of the boss 85 and the projection 96 of the flange 95 of the slider 94. Thus, the one end of the slider 94 pushes the surface 100 of the lever 98 rightwards in the drawing and accordingly the surface 101 of the lever 98 pushes the spring retainer 44 rightwards in the drawing due to pivoting of the lever 98 around the pin 99. If the spring retainer 44 is thus pushed by the other end 101 of the lever 98, the spring 48 between the inside of the spring retainer 44 and the spool 47 of the hydraulic pressure control valve 46 is compressed increasing the tension of the spring 48 similarly to the previous embodiment shown in FIGS. 2 and 3.

When the spring retainer 44 is pressed by the other end 101 of the lever 98 and accordingly the spring 48 is compressed, the spring 48 pushes the spool 47 of the control valve 46 rightwards in the drawing with the result that similarly to the previous embodiment shown in FIGS. 2 and 3 the hydraulic pressure delivered from the pump 51 changes proportionally to the transmitting torque of the rotation of the intermediate shaft 86.

The engagement between the recess 92 of the boss 85 and the projection 96 of the flange 95 of the slider 94 may be constructed as seen in FIGS. 13B and 14B.

In order to keep the contact between the recess 92 of the boss 85 and the projection 96 of the flange 95 of of the slider 94, the spring 48 may be utilized similarly to that shown in FIGS. 2 and 3.

FIGS. 15 and 16 show a further embodiment of the device for controlling the hydraulic pressure to an automatic transmission in accordance with the present invention having a pin and link instead of the channel and projection used in the previous embodiment shown in FIGS. 2 and 3.

This device comprises a gear 110 supported through bearings 21 and 22 by a transmission casing (not shown) and having an internal spline 24 formed inside thereof and an axial hollow extension 25, a plurality of pins 111 secured to said hollow extension 25 and a plurality of links 112 each pivotally secured by said pins 111 and having three arms 113, 114 and 115 wherein the arms 113 and 115, 114 and 115 are angled perpendicularly and also having a hole 116 at the center in which the pin 111 is pivotally inserted (in FIGS. 20 and 21) and boss 117 provided at the end of the arm 115, a retainer 118 secured to the pin 111 for holding the links 112 secured to the pin 111, a shaft 119 having an external spline 120 at the end of the gear 110 and another external spline 121 formed on the other end, a slider 122 formed to be hollow and in contact with either of the arms 113 and 114 and having an expanded cylindrical portion 123 formed at the end thereof which portion 123 is formed with recesses 124 for engaging with the arms 115 of the links and also having an internal spline 125 meshed with the spline 121 of the shaft 119, in addition to the sleeve 39 engaged with the transmission casing so that it is fixed in rotational direction with the key 40 while it can slide axially and is in contact through the bearing 41 with the slider 122 at one end, the lever 42 supported by the pin 43 fixed to the transmission casing and having one end in contact with the one end of the sleeve 39 as shown in FIGS. 16 and 17, and the spring retainer 44, the hydraulic pressure control valve 46, the spring 48, the hydraulic circuit 49, and another hydraulic circuit 52 the same as seen in FIGS. 2 and 3.

In operation of the device thus constructed, when the torque from the engine is transmitted from the gear 110 through the splines 24 and 120 and the shaft 119 and the splines 121 and 125, the shaft 119 is twisted by the transmitting torque therethrough so that a relative displacement occurs between the hollow extension 25 attached to the pin 111 and the expanded cylindrical portion 123 with the result that the connecting line between the pin 111 and the boss 117 is inclined with respect to the axial line of the shaft 119 from the parallel relationship as best seen in FIGS. 18 and 19. Thus, the link 112 pivots around the pin 111 as a center so that for example, the arm 113 of the link 112 pushes the end surface of the expanded cylindrical portion 123 of the slider 122 leftwards in the drawings and accordingly the other end of the slider 122 pushes the one end of the lever 42. When the one end of the lever 42 is pushed by the other end of the slider 122, the other end of the lever 42 pushes the spring retainer 44 rightwards in FIGS. 2 and 3 due to pivoting of the lever 42 around the pin 43. Thus, the tension of the spring 48 pushing the spool 47 of the control valve 46 is varied in response to the axial displacement of the slider 122 due to the relative displacement between the hollow extension 25 and the expanded cylindrical portion 123 and accordingly to the transmitting torque through the shaft 119 so that the hydraulic pressure changes in response to the variation of torque. Since the link 112 has arms 113 and 114, even if the shaft 119 is rotated in the other direction, the hydraulic pressure is varied in response to the torque transmitted through the shaft 119.

Although the previous embodiments adopt the hydraulic pressure control valve for controlling the oil pressure derived from the oil pump, these devices may use a hydraulic pressure control valve for producing an oil pressure signal representing the torque so that the built oil pressure is used for controlling the main oil pressure control valve or a certain control valve.

It is an advantage of the present invention that the hydraulic pressure is accurately controlled in response to the torque transmitted through the shaft in the transmission in comparison with the devices for controlling the hydraulic pressure by means of the vacuum in the intake-manifold or the movement of the throttle lever because the transmitting torque is directly measured by means of the displacement of the lever.

It is another advantage of the present invention that the hydraulic pressure is controlled instantly in response to the variation of the torque because of constant mechanical measurement of the torque.

We claim:

1. A device for controlling a hydraulic pressure to an automatic transmission of an automobile comprising
   a gear supported through bearings by a transmission casing and having an internal spline formed inside thereof and also having an axial hollow extension formed with an external spline,
   a thrust ring having an internal spline formed inside thereof for engaging with said external spline of said gear, a plurality of axial extensions and a plurality of projections having tapered flanks,
   a shaft having an external spline formed on one end and another external spline formed on the other end and supported through a bearing by the transmission casing,
   a slider having a plurality of recesses formed on one end and being wider than said axial extensions of said thrust ring and having a plurality of channels formed correspondingly to said plurality of projections of said thrust ring having tapered flanks and further having an internal spline meshed with said external spline of said shaft so that said slider is slidable to said shaft,
   a sleeve engaged with said transmission casing so that it is fixed in rotational direction with a key while it is axially slidable and in contact through a bearing with said slider at one end,
   a lever supported by a pin fixed to said transmission casing and having one end in contact with the one end of said sleeve,
   a spring retainer slidably inserted into a hole formed in said transmission casing and in contact with the other end of said lever,
   a hydraulic pressure control valve having a spool slidably inserted into said hole,
   a spring disposed between the inside of said spring retainer and said spool of said valve for applying pressure on the one end of said lever at one end and on said spool at the other end,
   a hydraulic circuit connecting one end of said control valve with an outlet of an oil pump, and
   another hydraulic circuit connecting the other end of said control valve with an inlet of said pump whereby the hydraulic pressure in the hydraulic circuit connected with said outlet of the pump changes in response to the change of the torque of the turbine shaft of a torque converter.

2. A device as set forth in claim 1, wherein the shape of said projections of said thrust ring and said recesses of said slider are axially symmetrical at the center thereof whereby said hydraulic pressure proportional to said transmitting torque is provided regardless of the direction of the rotation of said shaft.

3. A device for controlling a hydraulic pressure to an automatic transmission of an automobile comprising
   a gear supported through bearings by a transmission casing and having an internal spline formed inside thereof and an axial hollow extension formed with an external spline,
   a thrust ring having an internal spline formed inside thereof for engaging with said external spline of said gear, a plurality of axial extensions and a plurality of projections having tapered flanks,
   a shaft having an external spline formed on one end and another external spline formed on the other end and supported through a bearing by the transmission casing,
   a slider having a plurality of recesses formed on one end and being wider than said axial extensions of said thrust ring and having a plurality of channels formed correspondingly to said plurality of projections of said thrust ring having tapered flanks and further having an internal spline meshed with said external spline of said shaft so that said slider is slidable relative to said shaft,
   a sleeve engaged with said transmission casing so that it is fixed in rotational direction with a key while it is axially slidable and in contact through a bearing with said slider at one end,
   a lever supported by a pin fixed to said transmission casing and being in contact at one end with said sleeve and having teeth at the other end,
   a gear supported by a shaft attached to said transmission casing and meshed with said teeth of said lever,
   a cam attached to said gear,
   a spring retainer slidably inserted into a hole formed in said transmission casing and in contact with the surface of said cam,
   a hydraulic pressure control valve having a spool slidably inserted into said hole,
   a spring placed between the inside of said spring retainer and said spool of said valve for applying pressure on said cam at one end and on said spool at the other end through the engagement of the gear fixed to the cam and the teeth formed on the other end of the lever,
   a hydraulic circuit connecting one end of said control valve with an outlet of an oil pump, and
   another hydraulic circuit connecting the other end of said control valve with an inlet of the pump so that the hydraulic pressure in the hydraulic circuit connected with the outlet of the pump changes in response to the torque of the engine.

4. A device for controlling a hydraulic pressure to an automatic transmission of an automobile having a torque converter including an impeller driven by an output shaft of an engine, a turbine hydraulically driven by means of a hydraulic oil by said impeller, and a stator comprising
   a boss integral with said turbine of the torque converter and having projections formed with recesses and having an internal spline formed inside thereof,
   an intermediate shaft secured to said boss at one end with an external spline formed at the other end,
   a slider which has a flange formed at one end and having a plurality of projections the shapes of which are similar to those of said recesses engaging in alignment with each other and which is hollow and is formed with an internal spline at the other end and meshed with said external spline of said shaft and which is also supported by said shaft,
   a lever rockably supported by a pin with contacting surface at the middle thereof for touching the end surface of said slider and also with a second contacting surface at the other end, a spring retainer slidably inserted into a hole formed in the transmission casing and in contact with the other end of said lever, a hydraulic pressure control valve having a spool slidably inserted into the hole, a spring placed between the inside of said spring retainer and said spool of said valve for applying pressure on the one end of said lever at one end and said spool at the other end, a hydraulic circuit connecting one end of said control valve with an outlet of an oil pump, and another hydraulic circuit connecting the other end of said control valve with an inlet of said pump so that the hydraulic pressure in the hydraulic circuit connected with the outlet of the pump changes in response to the torque of the engine.

5. A device for controlling a hydraulic pressure to an automatic transmission of an automobile comprising a gear supported through bearings by a transmission casing and having an internal spline formed inside thereof and an axial hollow extension, a plurality of pins secured to said hollow extension and a plurality of links each pivotally secured by one of said pins and having three arms adjacent two of which are angled perpendicularly and also having a hole at the center in which said pin is pivotally inserted and a boss provided at the end of the intermediate arm of said links, a retainer secured to said pin for holding the links secured to said pin, a shaft having an external spline at the end of said gear and another external spline on the other end, a slider formed to be hollow and in contact with either of said arms being on a same line and having an expanded cylindrical portion formed at the end thereof which portion is formed with recesses for engaging with said intermediate arms of said links and also having an internal spline meshed with the spline of said shaft, a sleeve engaged with said transmission casing so that it is fixed in rotational direction with a key while it can slide axially and is in contact through a bearing with said slider at one end and is also in contact at the other with one end of said sleeve, a lever supported by a pin fixed to said transmission casing and having a fork at one end in contact with the one end of said sleeve, a spring retainer slidably inserted into a hole formed in said transmission casing and in contact with the other end of said lever, a hydraulic pressure control valve having a spool slidably inserted into said hole, a spring placed between the inside of said spring retainer and said spool of said control valve for applying pressure on the one end of said lever at one end and on said spool at the other end, a hydraulic circuit connecting one end of said control valve with an outlet of an oil pump, and another hydraulic circuit connecting the other end of said control valve with an inlet of said pump so that the hydraulic pressure in the hydraulic circuit connected with said outlet of said pump changes in response to the torque of the engine.

References Cited
UNITED STATES PATENTS

| | | | |
|---|---|---|---|
| 2,387,398 | 10/1945 | Hruska et al. | 60—54 |
| 2,959,984 | 11/1960 | Wickman | 74—688 |
| 3,180,095 | 4/1965 | Schneider | 60—54 |
| 3,416,393 | 12/1968 | Hattori | 74—731 |

ARTHUR T. McKEON, Primary Examiner

U.S. Cl. X.R.

74—688, 731